US008510482B2

(12) United States Patent (10) Patent No.: US 8,510,482 B2
Circello et al. (45) Date of Patent: Aug. 13, 2013

(54) DATA PROCESSING SYSTEM HAVING PERIPHERAL-PACED DMA TRANSFER AND METHOD THEREFOR

(75) Inventors: Joseph C. Circello, Phoenix, AZ (US); John D. Mitchell, Round Rock, TX (US); Sheilah C. Phan, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 13 days.

(21) Appl. No.: 12/768,391

(22) Filed: Apr. 27, 2010

(65) Prior Publication Data

US 2011/0264829 A1 Oct. 27, 2011

(51) Int. Cl.
*G06F 3/00* (2006.01)
*G06F 13/28* (2006.01)
*G06F 13/00* (2006.01)
*G06F 13/12* (2006.01)
*G06F 13/38* (2006.01)

(52) U.S. Cl.
USPC ......... 710/22; 710/1; 710/34; 710/35; 710/62

(58) Field of Classification Search
USPC ...................... 710/1–22, 34, 35, 62
See application file for complete search history.

(56) References Cited

U.S. PATENT DOCUMENTS

| 4,972,312 | A | | 11/1990 | den Boef | |
|---|---|---|---|---|---|
| 5,822,568 | A | * | 10/1998 | Swanstrom | 703/24 |
| 5,890,002 | A | * | 3/1999 | Li et al. | 710/260 |
| 6,065,070 | A | * | 5/2000 | Johnson | 710/22 |
| 6,370,598 | B1 | * | 4/2002 | Martwick | 710/15 |
| 6,418,459 | B1 | * | 7/2002 | Gulick | 718/104 |
| 6,502,123 | B1 | * | 12/2002 | Gulick | 718/102 |
| 6,766,383 | B1 | | 7/2004 | Pan et al. | |
| 7,502,896 | B2 | * | 3/2009 | Isani et al. | 711/151 |
| 8,214,561 | B2 | * | 7/2012 | Kuehm et al. | 710/57 |
| 2006/0288129 | A1 | * | 12/2006 | Pope et al. | 710/22 |
| 2007/0162651 | A1 | * | 7/2007 | Gwilt et al. | 710/22 |
| 2009/0228618 | A1 | * | 9/2009 | Kuehm et al. | 710/52 |

* cited by examiner

*Primary Examiner* — Idriss N Alrobaye
*Assistant Examiner* — Getente A Yimer
(74) *Attorney, Agent, or Firm* — Daniel D. Hill; Joanna G. Chiu

(57) ABSTRACT

In a data processing system having a processor, a DMA controller, a peripheral, and a memory, a method includes initiating a DMA transfer between the peripheral and the memory, wherein the DMA transfer comprises N subsets of data to be transferred between the peripheral and the memory, N having a value of two or more; asserting, by the peripheral, an event status indicator each time an event is completed by the peripheral; in response to each assertion of the event status indicator, the peripheral, based on a data request enable signal from the DMA controller, performing one of asserting a data request signal provided to the DMA controller or providing an interrupt request to the processor; and in response to each assertion of the data request signal, the DMA controller initiating transfer of a next subset of data of the N subsets of data between the memory and the peripheral.

20 Claims, 3 Drawing Sheets

DATA PROCESSING SYSTEM HAVING PERIPHERAL-PACED DMA TRANSFER AND METHOD THEREFOR

BACKGROUND

1. Field

This disclosure relates generally to data processing, and more specifically, to a data processing system having peripheral-paced DMA transfer and method therefor.

2. Related Art

Direct memory access (DMA) data transfers are commonly used in data processing systems to transfer data from various modules in the data processing system with minimal processor involvement. In a typical DMA transfer between, for example, a peripheral module and a memory, initiation of the transfer may be controlled by the peripheral. When the peripheral module initiates the DMA transfer, the DMA transfer is said to be peripheral-paced. Upon completion of the transfer, the DMA controller typically generates a DMA interrupt to the processor. In the resulting DMA interrupt service routine, control is passed to a peripheral interrupt service routine that finishes any required processing. Executing the interrupt service routine can be complex and time consuming. As popularity of DMA data transfers migrates into lower-end devices having an increasing number of peripherals, efficient handling of peripheral-paced DMA tasks becomes a larger issue for system performance.

Therefore, what is needed is a more efficient mechanism for handling the completion of DMA tasks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
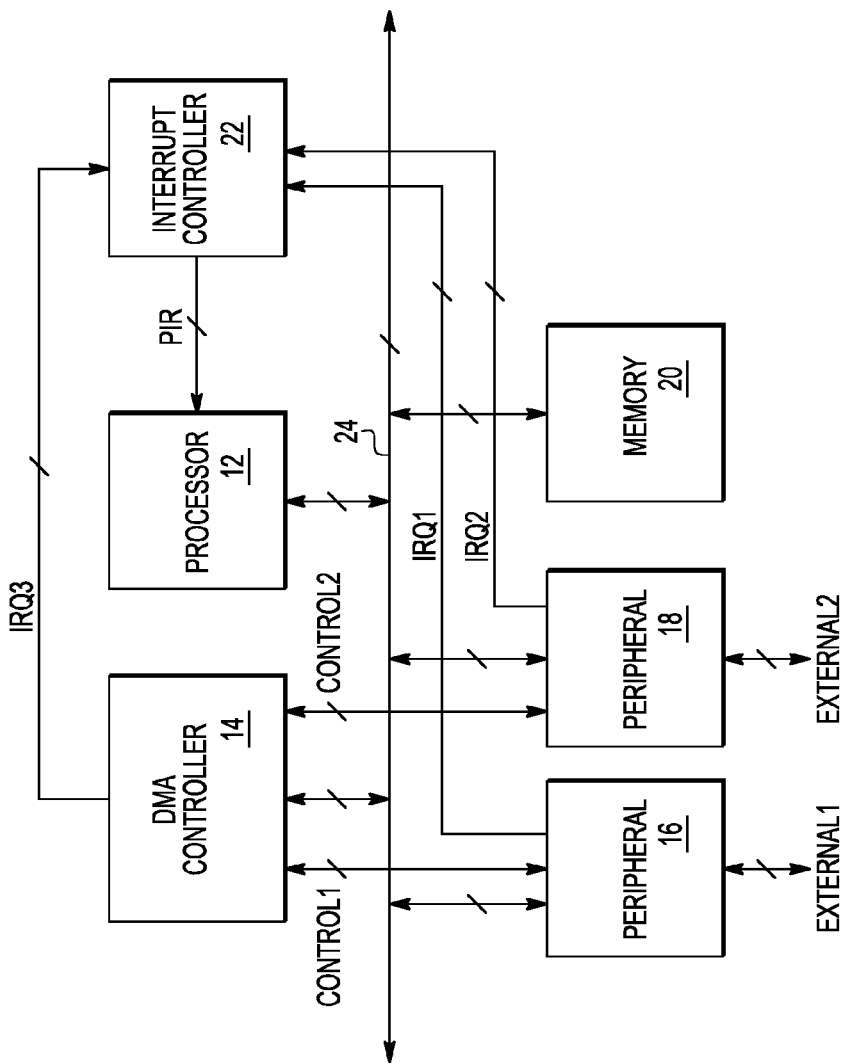
FIG. 1 illustrates, in block diagram form, a data processing system in accordance with an embodiment.

Generally, there is provided, a data processing system having a DMA controller, one or more peripherals, a memory, and a processor. In accordance with one embodiment, a DMA data transfer of N subsets of data is requested by a peripheral, where N is an integer greater than 1. The peripheral asserts a DMA request for one subset of the data. After transferring the subset of data the peripheral will process the data and assert a transfer complete signal. The data is transferred one subset at a time between, for example, the peripheral and memory, with the peripheral processing the data after each subset is transferred. Each time a subset of data is transferred, a request acknowledge signal is asserted by the DMA controller to the peripheral. If the number of subsets transferred is less than N, then the DMA controller processes the DMA request signal from the peripheral and additional subsets of data are transferred until the number of transfers is equal to N. After the Nth subset is transferred, the DMA controller negates a DMA request enable signal to the peripheral. More specifically, in one embodiment, the process is initiated when a peripheral "event condition" is asserted. The event condition can be based on a transmit data register being empty or a receive data register being full. The peripheral processes the data and signals that the event condition occurred. Based on the pre-programmed state of the peripheral, the assertion of this event condition is converted into a DMA request or an interrupt request. Then, when the peripheral signals a final "event condition", the negated DMA request enable signal in the peripheral causes the peripheral to generate an interrupt request to notify the processor that the data transfer has been completed. By allowing the peripheral to assert the completion interrupt request instead of the DMA controller, the interrupt service routine is handled more efficiently by reducing the amount of post-processing required to complete a DMA transfer after the data transfer is complete.

In one aspect there is provided, in a data processing system having a processor, a direct memory access (DMA) controller, a peripheral, and a memory, a method comprising: initiating a DMA transfer between the peripheral and the memory, wherein the DMA transfer comprises N subsets of data to be transferred between the peripheral and the memory, N having a value of two or more; asserting a data request signal to request transfer of a next subset of data within the N subsets of data; in response to the asserting of the data request signal, the DMA controller initiating the transfer of the next subset of data between the memory and the peripheral; after completion of the transfer of the next subset of data between the memory and the peripheral, again asserting the data request signal to request transfer of a last subset of data within the N subsets of data; in response to the again asserting the data request signal, the DMA controller initiating the transfer of the last subset of data between the memory and the peripheral, wherein the transfer of the last subset of data between the memory and the peripheral completes the DMA transfer; and after completion of the transfer of the last subset of data between the memory and the peripheral, the peripheral providing an interrupt request to the processor to indicate completion of the DMA transfer. The DMA controller may provide a request enable signal to the peripheral, wherein the method may further comprise the DMA controller asserting the request enable signal, wherein the step of asserting the data request signal to request transfer of the next subset of data is performed in response to the request enable signal being asserted. The step of again asserting the data request signal to request transfer of the last subset of data may be performed in response to the request enable signal being asserted. The method may further comprise: the DMA controller negating the request enable signal, wherein the step of providing the interrupt request to the processor is performed in response to the request enable signal being negated. After the completion of the transfer of the next subset of data and prior to the peripheral again asserting the data request signal to request transfer of the last subset of data, the method may further comprise: performing, by the peripheral, a peripheral function; indicating, by the peripheral, completion of the peripheral function. The completion of the peripheral function may be indicated by asserting an event status bit within the peripheral. The step of again asserting the data request signal to request transfer of the last subset of data may be performed in response to assertion of the event status bit. The peripheral function may comprise receiving the next subset from a source external to the peripheral or transmitting a previous subset of data from the N subsets of data external to the peripheral, wherein the previous subset of data is transferred from the memory to the peripheral prior to the transfer of the next subset of data.

In another aspect there is provided, in a data processing system having a processor, a direct memory access (DMA) controller, a peripheral, and a memory, wherein the peripheral provides a data request signal to the DMA controller and the DMA controller provides a data request enable signal to the peripheral, a method comprising: initiating a DMA transfer between the peripheral and the memory, wherein the DMA transfer comprises N subsets of data to be transferred between the peripheral and the memory, N having a value of two or more; asserting, by the peripheral, an event status indicator each time an event is completed by the peripheral; in response to each assertion of the event status indicator, the peripheral, based on the data request enable signal, performing one of asserting the data request signal provided to the DMA controller or providing an interrupt request to the processor; and in response to each assertion of the data request signal, the DMA controller initiating transfer of a next subset of data of the N subsets of data between the memory and the peripheral. In response to each assertion of the event status indicator, the step of performing one of asserting the data request signal provided to the DMA controller or providing an interrupt request to the processor may comprise: when the data request enable signal is asserted, the peripheral asserting the data request signal; and when the data request enable signal is negated, the peripheral providing the interrupt request to the processor. The method may further comprise: the DMA controller asserting the data request enable signal in response to a configuration register bit. The method may further comprise: the DMA controller negating the data request enable signal after initiating transfer of a last subset of data of the N subsets of data between the memory and the peripheral, wherein the transfer of the last subset of data between the memory and the peripheral completes the DMA transfer. The interrupt request may be provided to the processor to indicate completion of the DMA transfer. In the method the peripheral completing the event may include receiving a subset of data of the N subsets of data from a source external to the peripheral or transmitting a subset of data of the N subsets of data external to the peripheral.

In yet another aspect there is provided a data processing system, comprising: a processor coupled to a system interconnect; a memory coupled to the system interconnect; a peripheral coupled to the system interconnect, the peripheral comprising a status indicator which is asserted each time a peripheral function is completed by the peripheral; and a DMA controller coupled to the system interconnect, wherein the DMA controller initiates a data transfer between the peripheral and the memory, wherein the data transfer comprises N subsets of data to be transferred between the peripheral and the memory, N having a value of two or more; wherein, in response to each assertion of the status indicator, the peripheral, based on a data request enable signal received from the DMA controller, performs one of: asserting a data request signal which is provided to the DMA controller, wherein, in response to each assertion of the data request signal by the peripheral, the DMA controller initiates transfer of a next subset of data of the N subsets of data between the memory and the peripheral, or provides an interrupt request to the processor indicating completion of the data transfer. In response to each assertion of the status indicator, the peripheral may assert the data request signal when the data request enable signal is asserted and the peripheral may provide the interrupt request to the processor when the data request signal is negated. The DMA controller may assert the data request enable signal in response to initiating the data transfer. The DMA controller may negate the data request enable signal after initiating transfer of a last subset of data of the N subsets of data between the memory and the peripheral, wherein the transfer of the last subset of data between the memory and the peripheral completes the data transfer. The peripheral may comprise an external port, and wherein the peripheral may perform the peripheral function by receiving a subset of data of the N subsets of data via the external port or by transmitting a subset of data of the N subsets of data via the external port. The peripheral may comprise control storage circuitry which stores a current value of the data request enable signal and status storage circuitry which stores a current value of the status indicator.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a data processing system 10 in accordance with an embodiment. In one embodiment, data processing system 10 is implemented on a single integrated circuit die. In other embodiments, data processing system may be implemented on more than one integrated circuit die. Data processing system 10 includes processor 12, DMA controller 14, peripherals 16 and 18, memory 20, and interrupt controller 22, where each is bi-directionally connected to a system interconnect 24. System interconnect 24 can be one of a variety of systems for interconnecting each of the modules with each other and processor 12. System interconnect 24 may be, for example, a system bus, a cross-bar switch, or the like. DMA controller 14 has a plurality of conductors labeled "CONTROL1" bi-directionally connected to peripheral 16, a plurality of conductors labeled "CONTROL2" bi-directionally connected to peripheral 18, and an output for providing an interrupt request labeled "IRQ3". Peripherals 16 and 18 each include ports and a plurality of conductors for bi-directionally communicating with another device or circuit external to data processing system 10, the plurality of conductors labeled, respectively, EXTERNAL1 and EXTERNAL2. Peripheral 16 has an output connected to interrupt controller 22 for providing an interrupt request signal labeled "IRQ1". Peripheral 18 has an output connected to interrupt controller 22 for providing an interrupt request signal labeled "IRQ2". Interrupt controller 22 has an output connected to an input of processor 12 for providing a processor interrupt request labeled "PIR".

Processor 12 may be a microprocessor core or a microcontroller for executing instructions. Peripherals 16 and 18 may be, for example, a UART (universal asynchronous receiver/transmitter), a serial/parallel interface, an analog-to-digital converter, controller area network (CAN), or other modules that add functionality to data processing system 10. Frequently, a peripheral requires data from memory or another peripheral. A DMA controller is included to remove some of the processing burden from processor 12 due to data transfers between peripherals 16 and 18, and memory 20. Note that memory 20 can also be characterized as being a peripheral. In accordance with the illustrated embodiment, each of peripherals 16 and 18 and DMA controller 14 can generate an interrupt request (IRQ1, IRQ2, and IRQ3) to interrupt controller 22. In response to interrupt requests IRQ1, IRQ2, and IRQ3, interrupt controller 22 asserts processor interrupt request PIR to processor 12. The interrupt request is used to notify processor 12 of certain events. For example, DMA controller 14 may generate an interrupt IRQ3 to notify processor 12 that a DMA transfer has been completed.

In a typical processing system having a DMA controller, an interrupt service routine (ISR) having multiple steps is performed in response to an interrupt. First, the processor recognizes the interrupt request and initiates an interrupt exception. Second, the ISR performs the required processing to handle the interrupt in the DMA controller. Third, because there may be more peripheral modules than there are DMA channels, the ISR will determine the association between a DMA channel of the DMA controller and a peripheral module. Fourth, based on the association between the DMA channel and the peripheral module, the ISR passes control to an appropriate peripheral ISR. Fifth, the peripheral ISR then performs the necessary steps to complete any required servicing of the peripheral to complete the routine. Performing the above steps requires a significant number of processing cycles. The embodiment described herein simplifies the ISR by essentially eliminating the second, third, and fourth steps described above. The embodiment will be described in more detail below.

Figure 2:
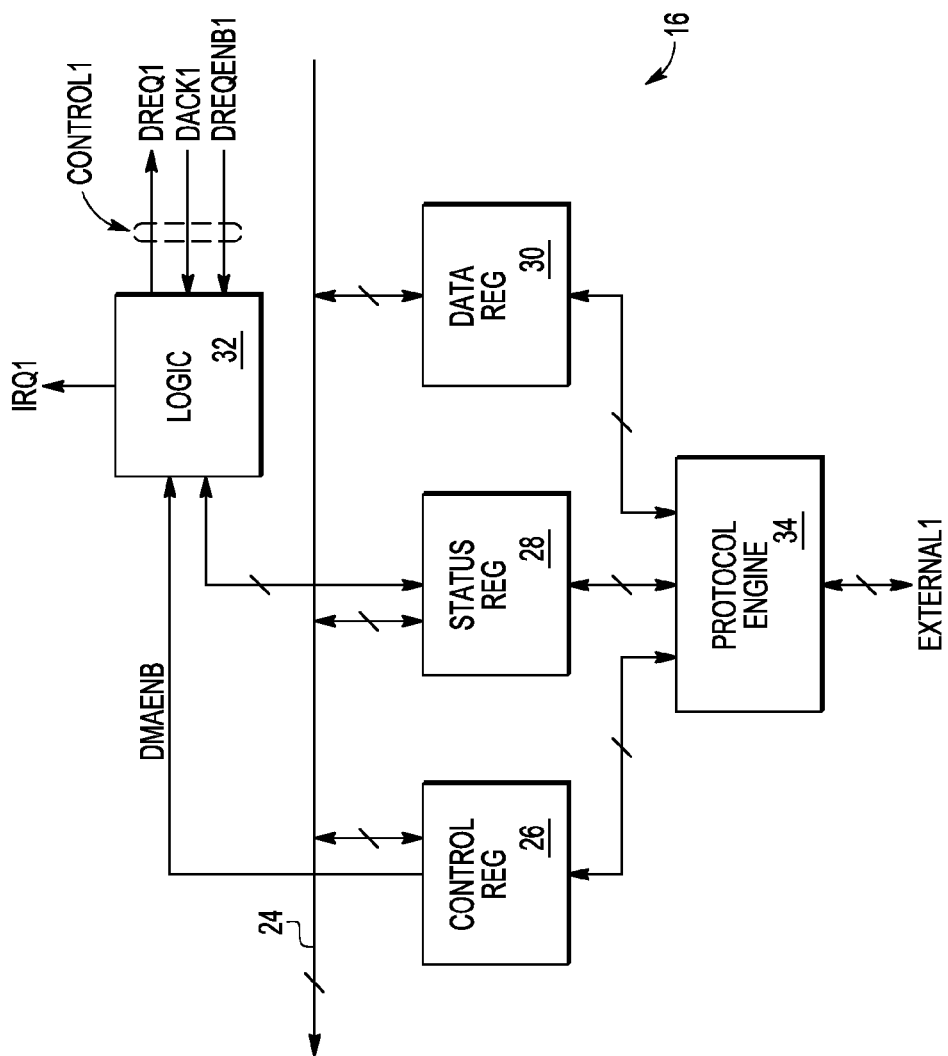
FIG. 2 illustrates, in block diagram form, one of the peripherals of FIG. 1 in more detail.

FIG. 2 illustrates, in block diagram form, a simplified peripheral 16 of FIG. 1 in more detail. Peripheral 16 is intended to represent any type of peripheral module by illustrating the portions of a module that would be the same or similar regardless of the module's function. Peripheral 16 includes control register 26, status register 28, and data register 30, logic 32, and protocol engine 34. Registers 26, 28, and 30 each includes a plurality of storage elements for storing information related to various operations of peripheral 16. Control register 26 includes a plurality of conductors bi-directionally connected to system interconnect 24, an output for providing a DMA enable signal labeled "DMAENB" to logic 32, and a plurality of conductors bi-directionally connected to protocol engine 34. Status register 28 includes a plurality of conductors bi-directionally connected to system interconnect 24, a plurality of conductors bi-directionally connected between status register 28 and logic 32, and a plurality of conductors bi-directionally connected to protocol engine 34. Data register 30 has a plurality of conductors bi-directionally connected to system interconnect 24, and a plurality of conductors bi-directionally connected to protocol engine 34. Logic 32 includes an output for providing interrupt request IRQ1, an output for providing a DMA request signal labeled "DREQ1", an input for receiving a DMA acknowledge signal labeled "DACK1", and a DMA request enable signal labeled "DREQENB1". Each of signals DREQ1, DACK1, and DREQENB1 are collectively labeled "CONTROL1" in FIG. 1 and FIG. 2.

Protocol engine 34 is for providing any one of a number of different functions in data processing system 10. For example, protocol engine 34 can be an analog-to-digital converter, a UART, a serial/parallel interface, a memory, or the like. Protocol engine 34 including a plurality of terminals, or conductors, for bi-directionally communicating with a device or system external to data processing system 10.

Figure 3:
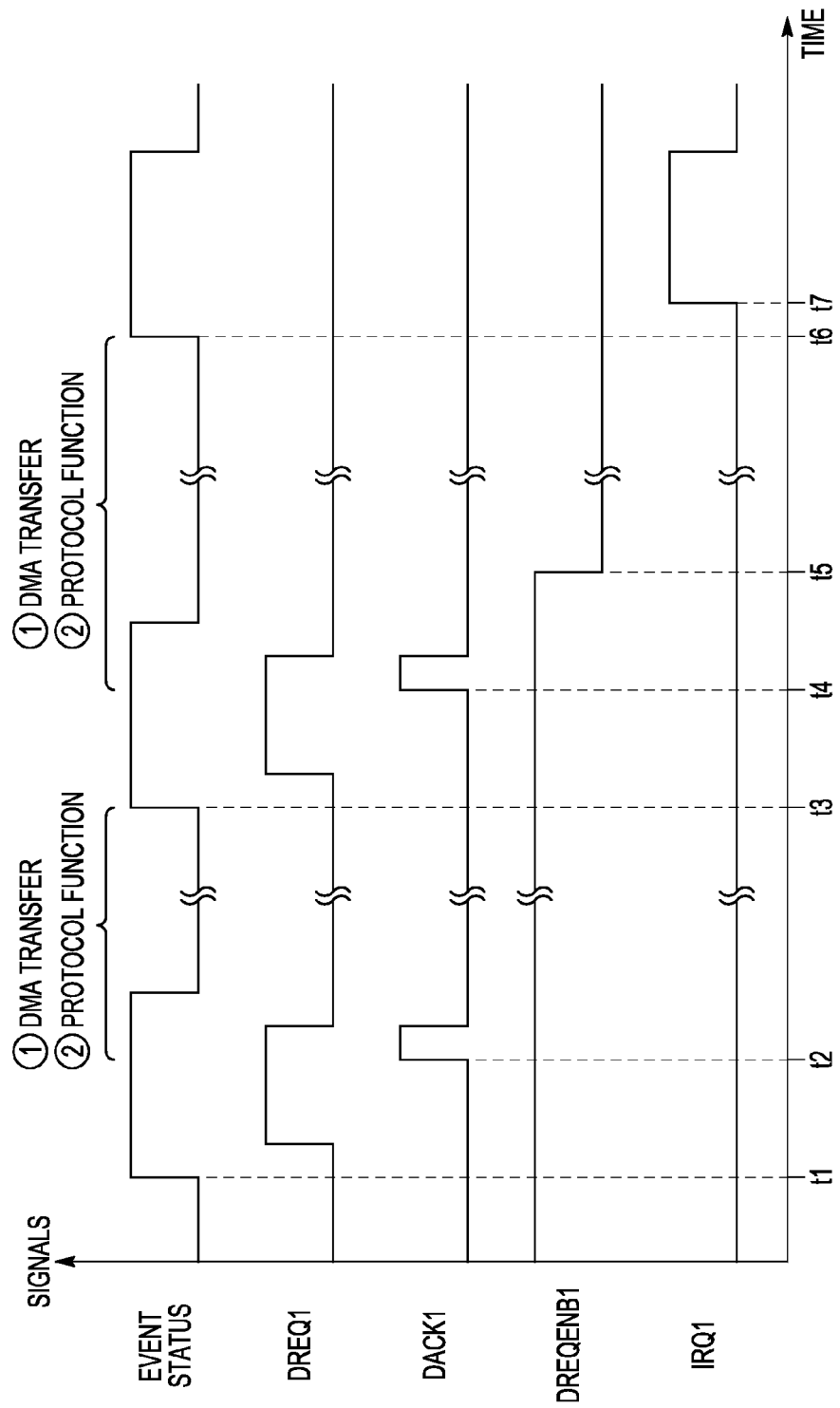
FIG. 3 illustrates a timing diagram of various signals during a DMA transfer of the data processing system of FIG. 1 and FIG. 2.

FIG. 3 illustrates a timing diagram of various signals during a peripheral-paced DMA transfer of the data processing system of FIG. 1 and FIG. 2. The operation of the illustrated embodiment will be described with reference to FIG. 1, FIG. 2, and FIG. 3. The transfer is between, for example, peripheral 16 and memory 20, where the DMA transfer includes N subsets of data. In FIG. 3, at time t1, an event status bit is asserted high. The event status bit is a part of status register 28 of peripheral 16. In accordance with the illustrated embodiment, the event status bit initiates either a DMA transfer between, for example, memory 20 and peripheral 16, or an interrupt request (IRQ1) generated by peripheral 16. When the DMA request enable signal DREQENB1 is asserted by DMA controller 14 as a logic high, peripheral 16 will assert data request signal DREQ1. The assertion of DREQ1 is based on the assertion of the DMAENB configuration setting from control register 26 and the assertion of the DREQENB1 input from DMA controller 14. When both signals are asserted, the signaling of the peripheral event status from status register 28 generates DREQ1. The Boolean equations associated with both IRQ1 and DREQ1 are: IRQ1=event1 & (~DMAENB1|~DREQENB1) and DREQ1=event1 & DMAENB1 & DREQENB. As noted above, the state of DREQENB1 is based on a DMA configuration bit that indicates DREQ1 should be sampled and logically AND'd with the fact that the data transfer count is less than N subsets. When all of the N subsets of data have been transferred, the DREQENB1 signal is negated. When the DMAENB or the data request enable signal (DREQENB1) is a logic low, peripheral 16 will assert interrupt request IRQ1 to the processor. The event status bit may be used for other event types as well. In response to the event status bit at time t1, a DMA request DREQ1 is asserted high by peripheral 16 to DMA controller 14 (FIG. 2) to transfer a next one of the N subsets. DMA controller 14 initiates the transfer of the next subset of data between memory 20 and peripheral 16. Data may be transferred from peripheral 16 to memory 20 or from memory 20 to peripheral 16. The data is transferred in N subsets, where N is an integer greater than 1. In one embodiment, a subset is a byte. Integer N is set as a counter value in DMA controller 14. Transfer acknowledge signal DACK1 is asserted from the DMA controller 14 to peripheral 16 in response to the DREQ1 signal at time t2. DMA controller 14 decrements a counter for each DACK1 signal as a way to count N subset transfers. Note that at time t2, DMA controller is acknowledging a next to last data subset N−1. Between times t2 and t3, the data is transferred and protocol engine 34 performs a function with the subset of data. In one embodiment, peripheral 16 may signal completion of the function by asserting the event status bit from status register 28. At time t3, an event status bit is again asserted. In response, peripheral 16 asserts the DMA request DREQ1 for another subset of data. The DMA request DREQ1 is acknowledged at time t4. The data being transferred is subset N, the last subset for this peripheral-paced transfer between peripheral 16 and memory 20. Therefore, at time t5, DMA controller 14 negates data request enable signal DREQENB1 as a logic low to allow peripheral 16 to generate interrupt IRQ1 to indicate the end of the DMA transfer to processor 12 via interrupt controller 22. Prior to time t5, the data request enable signal DREQENB1 is driven as a logic high. Between times t5 and t6, the data subset is transferred and protocol engine 34 performs a function on the data. At time t6, the final event status is asserted. In response, at time t7, interrupt request IRQ1 is asserted by peripheral 16 (because signal DREQENB1 is negated) to interrupt controller 22 and eventually to processor 12 to indicate completion of the data transfer. By allowing peripheral 16 to assert the interrupt request, instead of transferring control to DMA controller 14 so that DMA controller 14 can generate the interrupt, much of an interrupt service routine is avoided, resulting in a more efficient and less complex data transfer completion process following a DMA transfer.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a processor, a direct memory access (DMA) controller, a peripheral that is distinct from the DMA controller, and a memory, a method comprising:
    asserting a request enable signal, by the DMA controller, which initiates a data transfer between the peripheral and the memory, wherein the data transfer comprises N subsets of data to be transferred between the peripheral and the memory, N having a value of two or more;
    while the request enable signal is asserted, the peripheral asserting a data request signal to request transfer of a next subset of data within the N subsets of data;
    in response to the asserting of the data request signal, the DMA controller initiating the transfer of the next subset of data between the memory and the peripheral;
    after completion of the transfer of the next subset of data between the memory and the peripheral, the peripheral again asserting the data request signal to request transfer of a last subset of data within the N subsets of data;
    in response to the again asserting the data request signal, the DMA controller initiating the transfer of the last subset of data between the memory and the peripheral, wherein the transfer of the last subset of data between the memory and the peripheral completes the data transfer;
    deasserting the request enable signal, by the DMA controller, which provides an indication to the peripheral of the completion of the transfer of the last subset of data between the memory and the peripheral; and
    after the peripheral receives the indication of the completion of the transfer of the last subset of data between the memory and the peripheral, the peripheral asserting an interrupt request that is provided to the processor to indicate the completion of the data transfer, whereas the interrupt request is not asserted by the peripheral prior to completion of the transfer.

2. The method of claim 1, wherein the step of asserting the data request signal to request transfer of the next subset of data is performed in response to the request enable signal being asserted.

3. The method of claim 2, wherein the step of again asserting the data request signal to request transfer of the last subset of data is performed in response to the request enable signal being asserted.

4. The method of claim 1, wherein after the completion of the transfer of the next subset of data and prior to the again asserting the data request signal to request transfer of the last subset of data, the method further comprising:
    performing, by the peripheral, a peripheral function; and
    indicating, by the peripheral, completion of the peripheral function.

5. The method of claim 4, wherein the completion of the peripheral function is indicated by asserting an event status bit within the peripheral.

6. The method of claim 5, wherein the step of again asserting the data request signal to request transfer of the last subset of data is performed in response to assertion of the event status bit.

7. The method of claim 4, wherein the peripheral function comprises receiving the next subset from a source external to the peripheral or transmitting a previous subset of data from the N subsets of data external to the peripheral, wherein the previous subset of data is transferred from the memory to the peripheral prior to the transfer of the next subset of data.

8. The method of claim 1, wherein the data processing system further includes an interrupt controller, and the method further comprises:

the interrupt controller receiving the interrupt request directly from the peripheral without involvement of the DMA controller, and the interrupt controller providing the interrupt request to the processor to indicate the completion of the data transfer.

9. In a data processing system having a processor, a direct memory access (DMA) controller, a peripheral that is distinct from the DMA controller, and a memory, wherein the peripheral provides a data request signal to the DMA controller and the DMA controller provides a data request enable signal to the peripheral, a method comprising:

asserting the data request enable signal, by the DMA controller, which initiates a data transfer between the peripheral and the memory, wherein the data transfer comprises N subsets of data to be transferred between the peripheral and the memory, N having a value of two or more;

asserting, by the peripheral, an event status indicator each time an event is completed by the peripheral;

in response to each assertion of the event status indicator and while the request enable signal is asserted, the peripheral asserting the data request signal provided to the DMA controller;

in response to an assertion of the event status indicator and a deassertion of the data request enable signal, the peripheral asserting an interrupt request that is provided to the processor without involvement of the DMA controller to indicate completion of the data transfer, whereas the interrupt request is not asserted by the peripheral prior to completion of the transfer;

in response to each assertion of the data request signal, the DMA controller initiating transfer of a next subset of data of the N subsets of data between the memory and the peripheral; and in response to the DMA controller determining that the next subset of data is a last subset of data to be transferred between the memory and the peripheral, the DMA controller deasserting the data request enable signal.

10. The method of claim 9, wherein the step of the DMA controller asserting the data request enable signal is performed in response to a configuration register bit.

11. The method of claim 10, wherein the DMA controller deasserts the data request enable signal after initiating transfer of the last subset of data of the N subsets of data between the memory and the peripheral, wherein the transfer of the last subset of data between the memory and the peripheral completes the data transfer.

12. The method of claim 9, wherein the interrupt request provided to the processor indicates completion of the data transfer.

13. The method of claim 9, wherein the peripheral completing the event comprises receiving a subset of data of the N subsets of data from a source external to the peripheral or transmitting a subset of data of the N subsets of data external to the peripheral.

14. The method of claim 9, wherein the data processing system further includes an interrupt controller, and the method further comprises:

the interrupt controller receiving the interrupt request directly from the peripheral without involvement of the DMA controller, and the interrupt controller providing the interrupt request to the processor to indicate the completion of the data transfer.

15. A data processing system, comprising:

a processor coupled to a system interconnect;

a memory coupled to the system interconnect;

a peripheral coupled to the system interconnect, the peripheral comprising a status indicator which is asserted each time a peripheral function is completed by the peripheral; and a DMA controller coupled to the system interconnect and distinct from the peripheral, wherein the DMA controller asserts a data request enable signal which initiates a data transfer between the peripheral and the memory, wherein the data transfer comprises N subsets of data to be transferred between the peripheral and the memory, N having a value of two or more, and wherein the DMA controller deasserts the data request enable signal in response to determining that a next subset of data to be transferred is a last subset of data to be transferred;

wherein, in response to each assertion of the status indicator, the peripheral, based on the data request enable signal received from the DMA controller, performs one of:

asserting a data request signal which is provided to the DMA controller when the data request enable signal is asserted, wherein, in response to each assertion of the data request signal by the peripheral, the DMA controller initiates transfer of a next subset of data of the N subsets of data between the memory and the peripheral, or when the data request enable signal is deasserted, asserting an interrupt request that is provided to the processor without involvement of the DMA controller to indicate completion of the data transfer, whereas the interrupt request is not asserted by the peripheral prior to completion of the transfer.

16. The data processing system of claim 15, wherein the DMA controller asserts the data request enable signal in response to a configuration register bit.

17. The data processing system of claim 16, wherein the DMA controller deasserts the data request enable signal after initiating transfer of the last subset of data of the N subsets of data between the memory and the peripheral, wherein the transfer of the last subset of data between the memory and the peripheral completes the data transfer.

18. The data processing system of claim 15, wherein the peripheral comprises an external port, and wherein the peripheral performs the peripheral function by receiving a subset of data of the N subsets of data via the external port or by transmitting a subset of data of the N subsets of data via the external port.

19. The data processing system of claim 15, wherein the peripheral comprises control storage circuitry which stores a current value of the data request enable signal and status storage circuitry which stores a current value of the status indicator.

20. The data processing system of claim 15, further comprising:

an interrupt controller, which receives the interrupt request directly from the peripheral without involvement of the DMA controller, and which provides the interrupt request to the processor to indicate the completion of the data transfer.

* * * * *